(12) United States Patent
Nishio

(10) Patent No.: US 10,642,248 B2
(45) Date of Patent: May 5, 2020

(54) ERRONEOUS MOTION PREVENTION MECHANISM AND METHOD OF INDUSTRIAL MACHINE

(71) Applicant: MITUTOYO CORPORATION, Kanagawa (JP)

(72) Inventor: Yukimasa Nishio, Tokyo (JP)

(73) Assignee: MITUTOYO CORPORATION, Kanagawa (JP)

( * ) Notice: Subject to any disclaimer, the term of this patent is extended or adjusted under 35 U.S.C. 154(b) by 19 days.

(21) Appl. No.: 15/859,996

(22) Filed: Jan. 2, 2018

(65) Prior Publication Data
US 2018/0196406 A1    Jul. 12, 2018

(30) Foreign Application Priority Data

Jan. 12, 2017  (JP) ................. 2017-003250

(51) Int. Cl.
*G05B 19/409* (2006.01)
*G05B 19/406* (2006.01)
*G05B 19/402* (2006.01)

(52) U.S. Cl.
CPC ......... *G05B 19/406* (2013.01); *G05B 19/402* (2013.01); *G05B 2219/36262* (2013.01)

(58) Field of Classification Search
CPC ................ G05B 19/402; G05B 19/406; G05B 2219/36262
See application file for complete search history.

(56) References Cited

U.S. PATENT DOCUMENTS

| 4,595,989 | A | * | 6/1986 | Yasukawa | B25J 9/161 |
| | | | | | 318/568.1 |
| 5,426,874 | A | * | 6/1995 | Nakata | E02F 3/844 |
| | | | | | 37/348 |
| 6,289,783 | B1 | * | 9/2001 | Sagaser | E02F 9/2004 |
| | | | | | 91/427 |
| 2016/0211876 | A1 | * | 7/2016 | Yamamoto | H04B 1/3838 |
| 2016/0306534 | A1 | * | 10/2016 | Woo | G06F 3/04847 |

FOREIGN PATENT DOCUMENTS

JP    2012-078214 A    4/2012

* cited by examiner

*Primary Examiner* — Chun Cao
(74) *Attorney, Agent, or Firm* — Greenblum & Bernstein, P.L.C.

(57) ABSTRACT

A coordinate measuring machine includes a body, a controller configured to control the driving of the body, and an operation unit configured to provide a command to the controller via, for instance, an operation lever to manually operate the body. A contact detection sensor is attached to the operation unit. The controller includes a sensor signal determiner configured to detect an operation-enable signal in response to a detection signal from the contact detection sensor.

10 Claims, 9 Drawing Sheets

ERRONEOUS MOTION PREVENTION MECHANISM AND METHOD OF INDUSTRIAL MACHINE

The entire disclosure of Japanese Patent Application No. 2017-003250 filed Jan. 12, 2017 is expressly incorporated by reference herein.

TECHNICAL FIELD

The present invention relates to an industrial machine and a control method of the industrial machine.

BACKGROUND ART

Typical known industrial machines include a measuring machine that measures an object by a relative movement of a contact piece with respect to the object, and a working machine that machines an object by a relative movement of a working tool with respect to the object (see, for instance, Patent Literature 1: JP 2012-078214 A).

A machine of Patent Literature 1 includes a probe, a drive mechanism configured to three-axially move the probe, and an operation unit including an operation lever for operating the drive mechanism. An operator of such a coordinate measuring machine operates the drive mechanism using the operation lever of the operation unit to three-dimensionally move the probe with respect to an object.

In a typical coordinate measuring machine as described above, an operation command is immediately outputted to the drive mechanism in response to detection of, for instance, a tilt of the operation lever. Thus, for instance, if the arm or the like of the operator or any other worker accidentally touches the operation lever by carelessness, or if the operator accidentally lets the operation unit fall down to apply an external force to the operation lever, a motion of the drive mechanism unintended by the operator would be caused. Such an unintended motion may cause collision between the contact piece and the object, damaging the contact piece or the object.

SUMMARY OF THE INVENTION

An object of the invention is to provide an industrial machine and a control method of the industrial machine that allow for preventing an erroneous motion of a drive mechanism unintended by an operator.

According to an aspect of the invention, an industrial machine includes: a working portion configured to perform a predetermined operation on a workpiece; an operation unit configured to input an operation signal for instructing a motion of the working portion; and an operation detector configured to detect the operation signal, which is inputted in response to a predetermined operation, as an operation-enable signal for enabling the working portion to move.

An intentional operation being performed by an operator, which would not be caused by, for instance, careless contact with the operation unit, may be set in advance as the predetermined operation.

In the above aspect, the operation detector does not detect the operation signal from the operation unit as the operation-enable signal unless the predetermined operation is performed. Thus, even if an operator or any other worker accidentally touches the operation unit by carelessness or the like, the working portion is not enabled to move. Since the working portion does not move in accordance with the operation signal inputted from the operation unit, an erroneous motion of the working portion unintended by the operator can thus be prevented.

In the above aspect, it is preferable that the operation unit includes a body, and an operation lever including a shaft tiltable with respect to the body such that a tilt angle or a position of the shaft is changeable with respect to the body, the operation lever has a circumferential surface attached with a plurality of contact detection sensors configured to output contact detection signals when detecting contact with an object, and the operation detector is configured to detect input of the contact detection signals from at least two of the contact detection sensors as the operation-enable signal.

Even if an operator or any other worker accidentally hits him/herself on the operation lever by carelessness or the like, the above arrangement allows the operation detector to detect no operation-enable signal unless two or more of the contact detection sensors are simultaneously touched. The working portion is thus not enabled to move in accordance with the operation signal inputted from the operation unit, preventing an erroneous motion of the working portion unintended by the operator.

In the above aspect, it is preferable that at least a pair of the contact detection sensors are opposite to each other across the shaft of the operation lever, and the operation detector is configured to detect the input of the contact detection signals from the at least pair of the contact detection sensors as the operation-enable signal.

The above arrangement allows the operation detector to detect no operation-enable signal unless the pair of contact detection sensors, which are opposite to each other across the shaft of the operation lever, are simultaneously touched.

In operating the operation lever, an operator usually holds the operation lever by hand and moves the operation lever front and back and right and left. The operator thus inevitably touches the contact detection sensors opposite to each other across the shaft of the operation lever without intending, so that the operation-enable signal is detected to enable the working portion to be driven.

In contrast, if the operation lever is touched merely by, for instance, an arm or clothing (if the operation eve is operated against an operator's intention), both the contact detection sensors opposite to each other across the shaft of the operation lever are very unlikely to be touched at the same time, although merely one of the contact detection sensors would be touched by the arm or clothing. The above arrangement can thus more reliably prevent an erroneous motion of the working portion.

In the above aspect, it is preferable that the operation unit includes a body, and an operation lever including a shaft tiltable with respect to the body such that a tilt angle or a position of the shaft is changeable with respect to the body, and the operation detector is configured to detect the operation signal inputted in response to the predetermined operation as the operation-enable signal, the predetermined operation being moving the operation lever with respect to the operation unit at an acceleration or tilt equal to or below a predetermined threshold.

An upper limit obtainable during a normal operation by an operator may be set in advance as the predetermined threshold of the acceleration or tilt of the operation lever with respect to the operation unit.

Even if the operator accidentally lets the operation unit fall down to apply an external force to the operation lever, the above arrangement allows the operation detector to detect no operation-enable signal in response to an acceleration or tilt of the operation lever with respect to the operation unit exceeding the predetermined threshold. An erroneous motion of the working portion unintended by the operator can be prevented.

In the above aspect, it is preferable that the operation unit includes a living-body contact sensor configured to output a living-body contact signal in response to contact with a living body, and the operation detector is configured to detect the living-body contact signal from the living-body contact sensor as the operation-enable signal.

The above arrangement allows the living-body contact sensor to output no living-body contact signal if a non-living object such as a tool comes into contact with the operation unit. Since the operation detector does not detect the living-body contact signal from the living-body contact sensor as the operation-enable signal, an erroneous motion of the working portion can be prevented.

In the above aspect, it is preferable that the industrial machine further includes a drive controller configured to drive the working portion in accordance with the operation signal from the operation unit when the operation-enable signal is detected by the operation detector.

The above arrangement allows the drive controller not to drive the working portion in accordance with the operation signal from the operation unit unless the operation detector detects the operation-enable signal. An erroneous motion of the working portion unintended by the operator can thus be prevented.

According to another aspect of the invention, an industrial machine includes: an image probe including an image capturing unit configured to capture an image of an object; an operation unit configured to input an operation signal for instructing a motion of the image probe; an image determiner configured to determine whether the image from the image capturing unit is the same as a predetermined accepted image; and a drive controller configured to drive the image probe in accordance with the operation signal from the operation unit when the image determiner determines that the image is the same as the accepted image.

An image captured by an operator's intentional operation, such as an image of the operator's fingerprint, may be registered in advance as the predetermined accepted image.

The above arrangement allows the drive controller not to drive the image probe in accordance with the operation signal from the operation unit unless an accepted image is captured by an operator's intentional operation. Thus, even if the operator or any other worker accidentally touches the operation unit by carelessness or the like, the image probe is not driven to prevent an erroneous motion of the image probe unintended by the operator.

According to still another aspect of the invention, a control method of an industrial machine, the industrial machine including: a working portion configured to perform a predetermined operation on a workpiece; and an operation unit configured to input an operation signal for instructing a motion of the working portion, the control method includes: detecting the operation signal, which is inputted in response to a predetermined operation, as an operation-enable signal for enabling the working portion to move; and driving the working portion in accordance with the operation signal from the operation unit after the operation-enable signal is detected.

The control method of the above aspect provides the advantages described in relation to the above industrial machine.

The invention can thus prevent an erroneous motion of the working portion unintended by an operator.

BRIEF DESCRIPTION OF DRAWING(S)

DESCRIPTION OF EMBODIMENT(S)

First Exemplary Embodiment

A coordinate measuring machine 1, or an industrial machine, according to a first exemplary embodiment of the invention will be described below with reference to the attached drawings.

Figure 1:
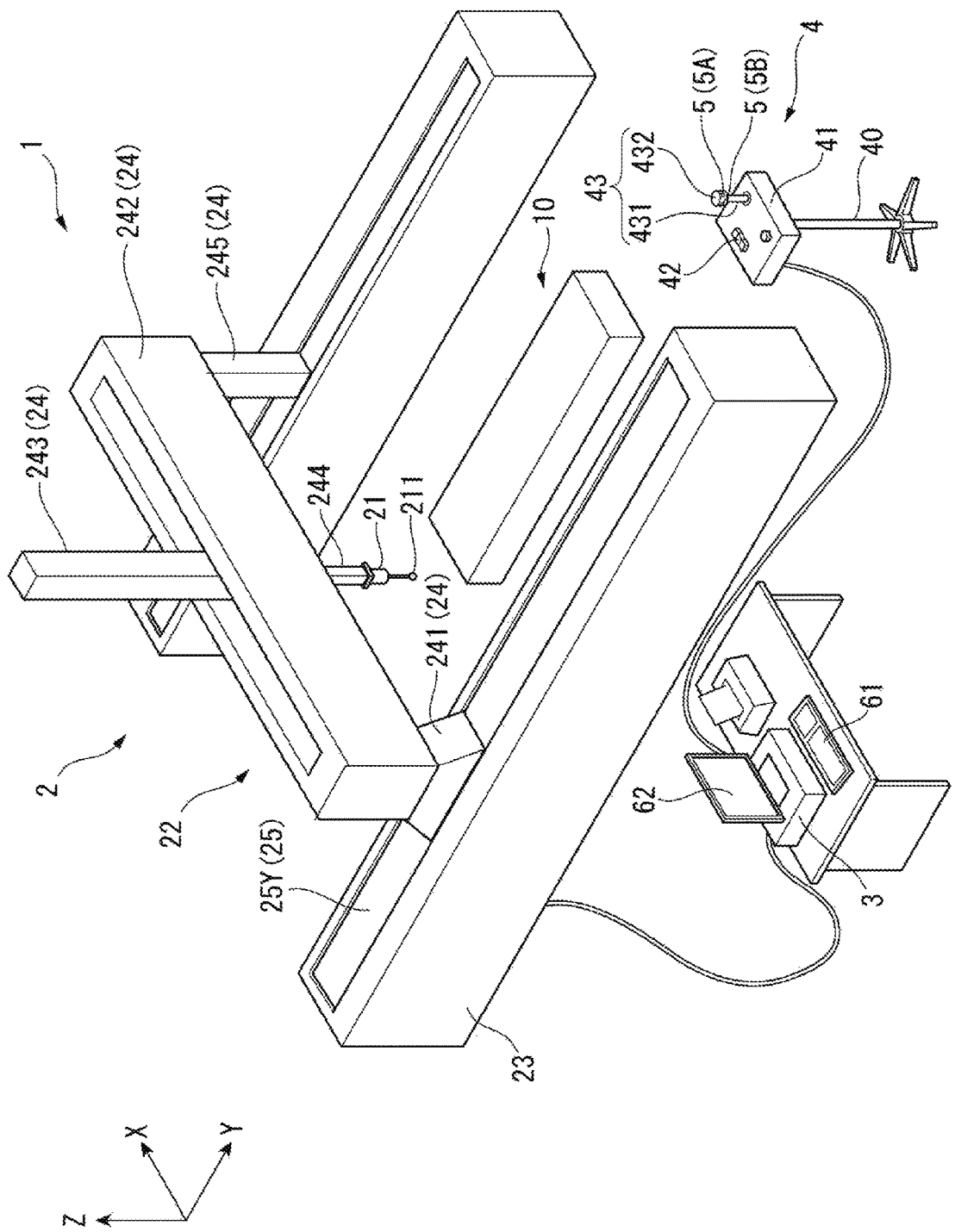
FIG. 1 is a schematic view of a coordinate measuring machine (industrial machine) according to a first exemplary embodiment of the invention.

FIG. 1 shows a schematic arrangement of the coordinate measuring machine 1 according to the first exemplary embodiment of the invention.

Referring to FIG. 1, the coordinate measuring machine 1 (industrial machine) includes a body 2, a controller 3 configured to control the driving of the body 2, and an operation unit 4 configured to provide a command to the controller 3 via, for instance, an operation lever to manually operate the body 2. The controller 3 includes an input device 61 for inputting, for instance, measurement conditions for the coordinate measuring machine 1, and a display 62 configured to display, for instance, measurement results provided by the coordinate measuring machine 1.

Arrangement of Body

The body 2 includes a probe 21 for measuring a workpiece 10, a motion mechanism 22 supporting a base end of the probe 21 (a +Z-axial end) and configured to move the probe 21, and a guide 23 on which the motion mechanism 22 is vertically located.

The probe 21 includes a contact piece 211 at a distal end (a −Z-axial end), the contact piece 211 being brought into contact with a surface of the workpiece 10.

The motion mechanism 22 includes a slide mechanism 24 supporting the base end of the probe 21 and configured to slide the probe 21, and a drive mechanism 25 configured to drive the slide mechanism 24 to move the probe 21.

The slide mechanism 24 includes: a column 241 mounted on the guide 23, which is located along the Y-axis direction, and slidable along the Y-axis direction; a beam 242 supported by the column 241 and extending along the X-axis direction; a slider 243, which is in the form of a rectangular column extending along the Z-axis direction, slidable on the beam 242 along the X-axis direction; and a ram 244 inserted in the slider 243 and slidable in the slider 243 along the Z-axis direction. A +X-axial end of the beam 242 is provided with a support 245 that extends along the Z-axis direction.

The drive mechanism 25 includes a Y-axis driver 25Y supporting the column 241 and configured to slide the column 241 along the Y-axis direction, an X-axis driver (not shown) configured to slide the slider 243 on the beam 242 along the X-axis direction, and a Z-axis driver (not shown) configured to slide the ram 244 in the slider 243 along the Z-axis direction.

Such drivers of the drive mechanism 25 each include a drive motor or drive source (not shown), and a driving-force transfer mechanism configured to transfer a.

driving force supplied from the drive motor to the slide mechanism 24, the driving force causing the sliding of the column 241, the slider 243 and the ram 244, Arrangement of Operation Unit The operation unit 4 includes an operation box 41 (body), and components provided to the operation box 41 such as an operation button 42 and an operation lever 43.

A leg 40 may be fixed to the operation box 41A to keep the operation box 41A at a predetermined level or may be omitted to make the operation box 41A portable for an operator. Alternatively, the leg 40 may be removably attachable.

The operation box 41 further includes a drive circuit (not shown connected to the operation button 42 and the operation lever 43. The drive circuit is configured to output, in response to an operation on the operation button 42 and/or the operation lever 43, a drive-command signal corresponding to the operation to the controller 3.

The operation lever 43, which may be a stick member being operated by an operator to manually move the probe 21 to a predetermined position, includes a shaft 431 tiltable with respect to the operation box 41, and a grip 432 rotatably attached to an end of the shaft 431. The operation lever 43, which is held by a lever drive mechanism to be tiltable with respect to the operation box 41, is configured to output to the controller 3 a tilt angle of the operation lever 43 and a drive-command signal corresponding to a tilt speed.

Figure 2:
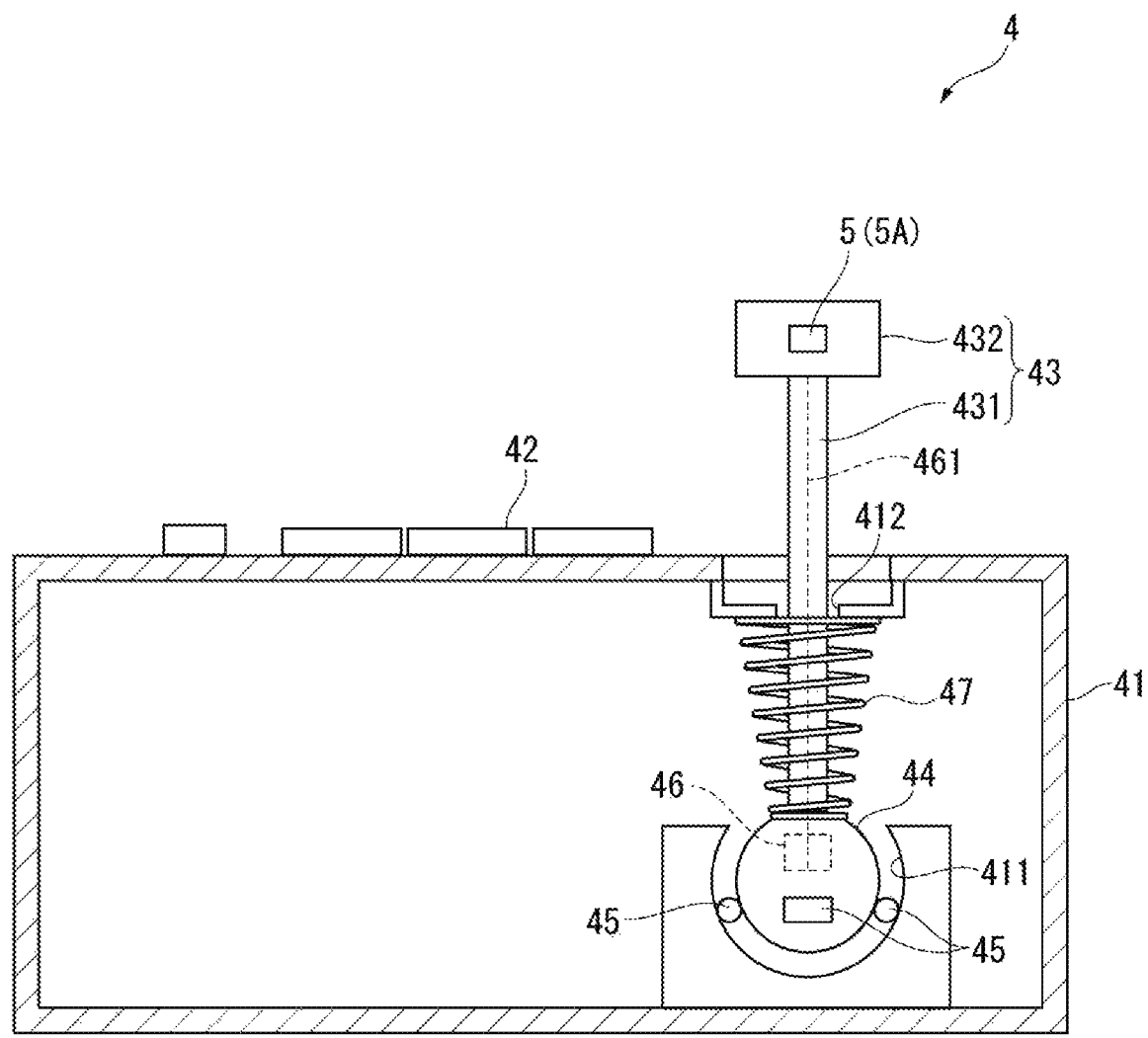
FIG. 2 is a sectional view of an operation unit according to the first exemplary embodiment.

FIG. 2 is a sectional view showing an example of the operation unit 4 according to the first exemplary embodiment of the invention.

The lever drive mechanism, which may be any mechanism enabling the driving of the lever, has, for instance, an arrangement as shown in FIG. 2.

In the exemplary arrangement shown in FIG. 2, the operation lever 43 is connected to a sphere 44 at an end of the shaft 431 opposite to the grip 432, and the shaft 431 is tiltably supported on the sphere 44. The operation box 41 further includes therein a holder frame 411 having an inner circumferential surface in the form of a spherical surface with a diameter slightly larger than that of the sphere 44. The inner circumferential surface of the holder frame 411 is provided with a plurality of rollers 45, which are biased toward a center of the frame (toward the operation lever 43).

The plurality of rollers 45 are each connected to a rotation detection sensor (not shown), which is configured to detect the rotation amount of each of the rollers 45. The rotation detection sensor then outputs to the controller 3 a drive-command signal, which corresponds to the rotation amount of each of the rollers 45, for moving the probe 21 in the X-axis direction and/or Y-axis direction.

It should be noted that the sphere 44 is biased downward by a spring 47, which is located between the operation lever 43 and the holder frame 411, to be kept in a neutral position. Each of the rollers 45 is thus prevented from slipping, allowing for accurately outputting to the controller 3 the drive-command signal corresponding to the tilt of the operation lever 43.

The operation box 41 is also provided with a window 412 through which the shaft 431 of the operation lever 43 is inserted, the window 412 determining a tilt-angle range of the operation lever 43 (shaft 431).

The grip 432 according to first exemplary embodiment is held rotatably around the shaft 431. The operation lever 43 includes therein a detection shaft 461 rotatable with the rotation of the grip 432, and a rotation detector 46 configured to detect the rotation amount of the grip 432 via the detection shaft 461. The rotation detector 46 then outputs to the controller 3 a drive-command signal, which corresponds to the rotation amount of the grip 432, for moving the probe 21 in the Z-axis direction.

The operator can thus three-axially move the probe 21 by tilting the operation lever 43 and rotating the grip 432.

Figure 3:
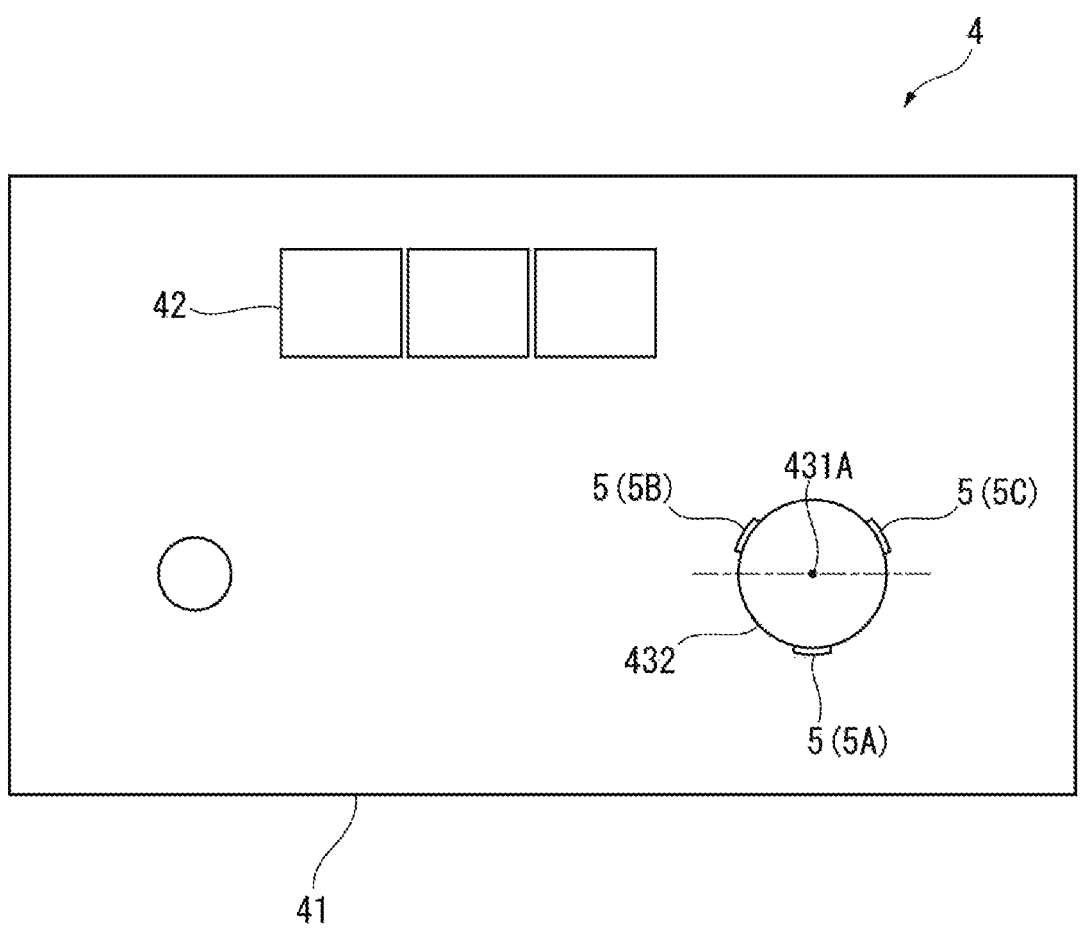
FIG. 3 is a plan view of the operation unit according to the first exemplary embodiment.

FIG. 3 is a plan view of the operation unit 4 according to the first exemplary embodiment of the invention.

As shown in FIG. 3, a plurality of contact detection sensors 5 (e.g., three of them) are attached to the operation lever 43 at a lateral surface of the grip 432. The contact detection sensors 5 are attached at regular intervals. Specifically, at least two of the contact detection sensors 5 are opposite to each other with respect to an axial center 431A of the operation lever 43. For instance, contact detection sensors 5B, 5C shown in FIG. 3 are opposite to a contact detection sensor 5A with respect to a centerline (shown by a chain line in FIG. 3) passing through the axial center 431A. Such an arrangement allows an operator's hand to come into contact with at least two of the contact detection sensors 5 when the operator holds the grip 432.

Incidentally, each of the contact detection sensors 5 may be a sensor configured to detect that the sensor is pressed or touched by human hand, such as a pressing button switch, a capacitance sensor, and a pressure-sensitive sensor. The first exemplary embodiment employs a pressing button switch as each of the contact detection sensors 5. When detecting the pressing, each of the contact detection sensors 5 outputs a detection signal to a later-described sensor signal determiner 31 (operation detector) of the controller 3.

Arrangement of Controller

Figure 4:
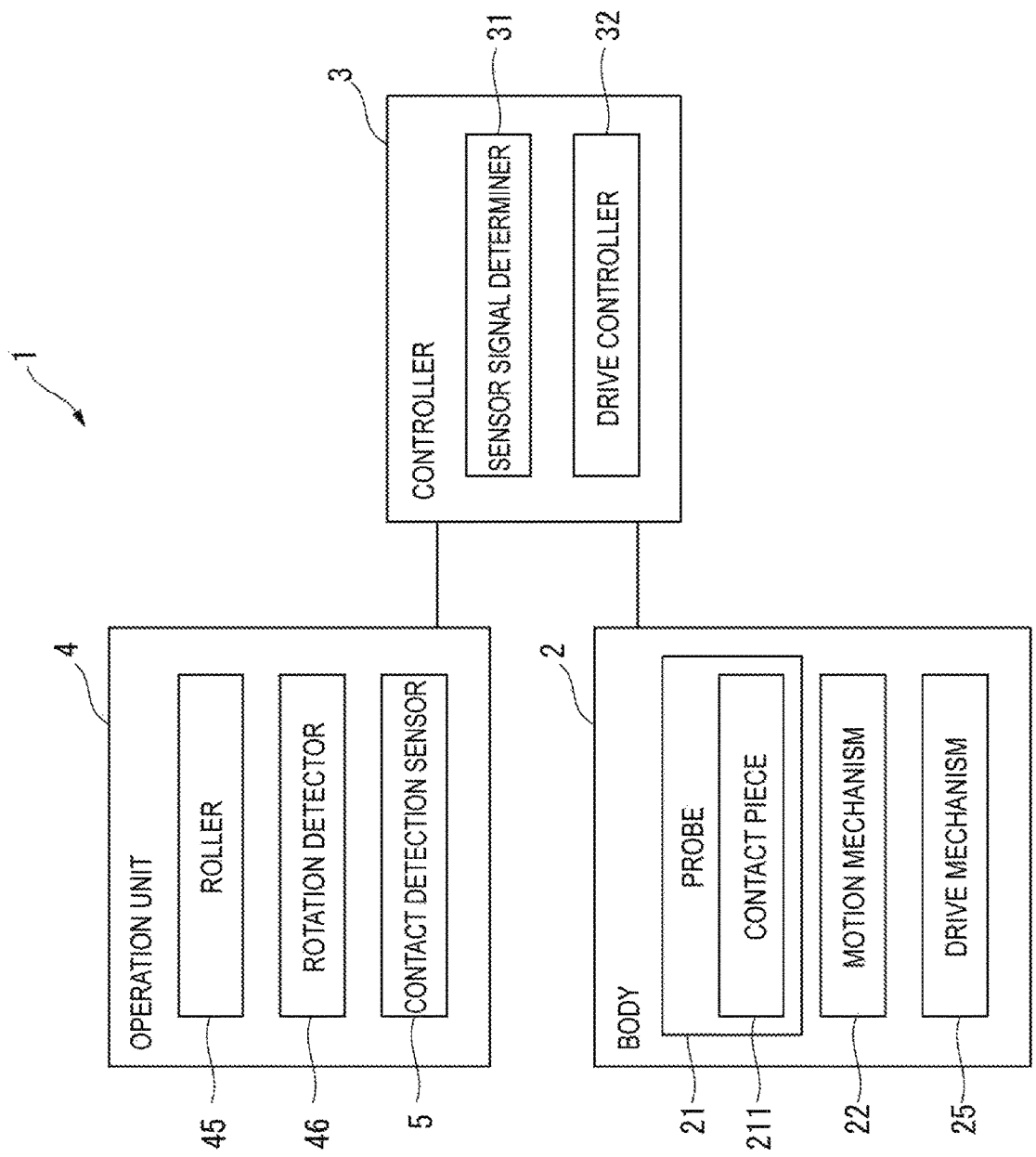
FIG. 4 is a block diagram showing a schematic arrangement of the coordinate measuring machine according to the first exemplary embodiment.

FIG. 4 is a block diagram showing a schematic arrangement of the coordinate measuring machine 1 according to the first exemplary embodiment of the invention.

As shown in FIG. 4, the controller 3 includes the sensor signal determiner 31 configured to detect a detection signal inputted from each of the contact detection sensors 5, and a drive controller 32 configured to control the driving of the drive mechanism 25 of the motion mechanism 22.

The sensor signal determiner 31 according to the first exemplary embodiment determines the detection of an operation-enable signal in response to detection signals inputted from two or more of the contact detection sensors 5. The drive controller 32 outputs no drive-control signal for controlling the driving of the drive mechanism 25 unless the drive-enable signal is inputted from the sensor signal determiner 31.

Motion Control of Coordinate Measuring Machine

Figure 5:
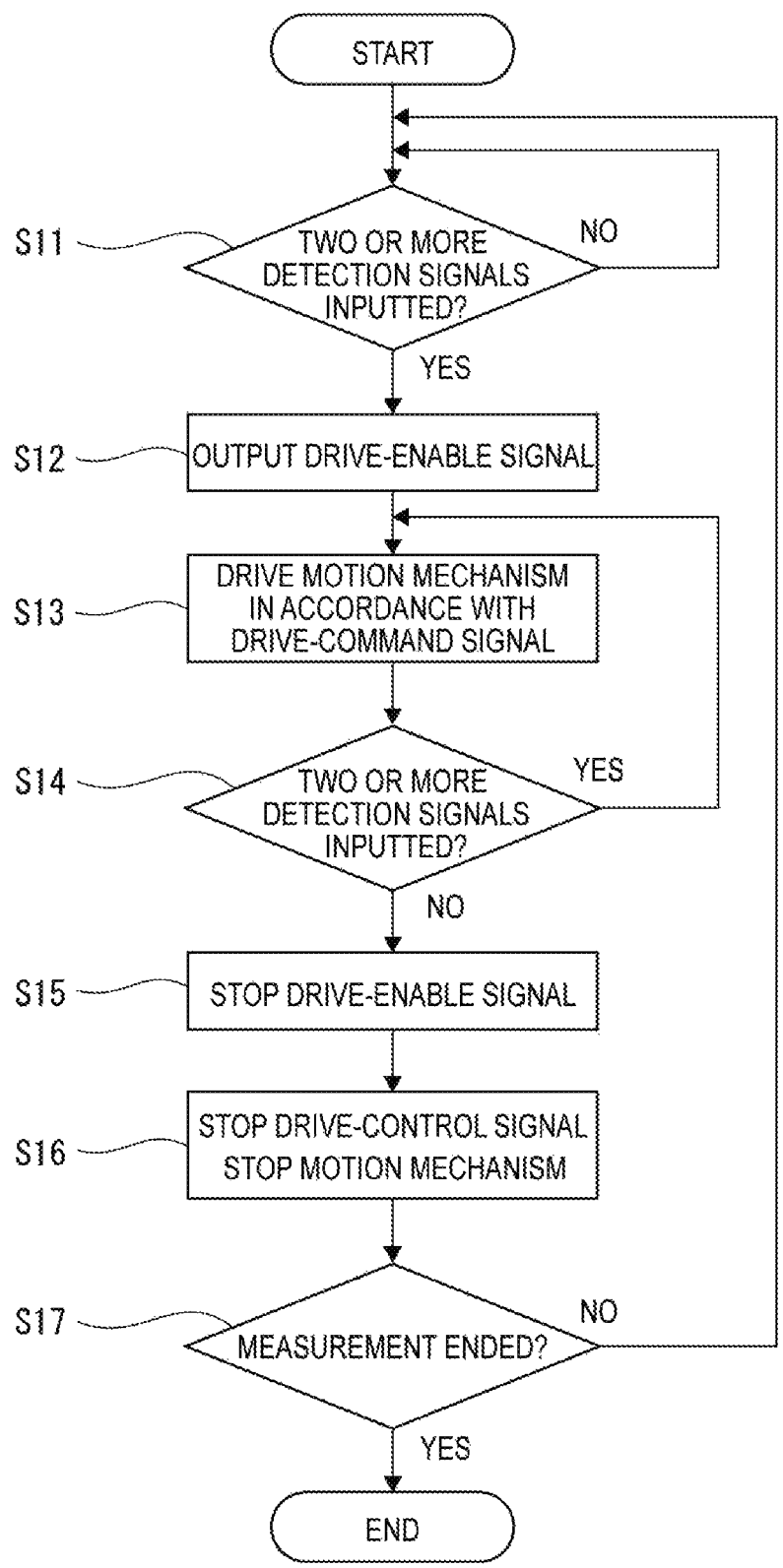
FIG. 5 is a flowchart showing a motion control of the coordinate measuring machine according to the first exemplary embodiment.

Next, description will be made on a motion control for preventing an erroneous motion of the drive mechanism 25 of the coordinate measuring machine 1 with reference to the drawing. FIG. 5 is a flowchart showing the motion control of the coordinate measuring machine 1.

First, as shown in FIG. 5, the sensor signal determiner 31 determines whether detection signals are inputted from two or more of the contact detection sensors 5 (Step S11).

When the determination result is No in Step S11, the sensor signal determiner 31 waits until detection signals are inputted from two or more of the contact detection sensors 5 (i.e., until the determination result in Step S11 becomes Yes).

The sensor signal determiner 31 determines the detection of an operation-enable signal in response to detection signals inputted from two or more of the contact detection sensors 5 as described above. If the operation lever 43 is accidentally touched by an operator's hand or clothing or by a tool or the like, two or more of the contact detection sensors 5 would not usually be touched. Thus, the sensor signal determiner 31 does not detect the input of an operation-enable signal (i.e., determines the absence of an operation-enable signal) if the operation lever 43 is accidentally tilted.

When the determination result in Step S11 is Yes, the sensor signal determiner 31 determines the detection of an operation-enable signal and outputs a drive-enable signal to the drive controller 32 (Step S12). In moving the probe 21 using the operation lever 43, an operator usually holds the operation lever 43 by hand (grips the operation lever 43) to tilt the operation lever 43 as described above. At this time, the hand touches at least two of the three contact detection sensors 5 of the operation lever 43, which are opposite to each other with respect to the axial center 431A. The sensor signal determiner 31 thus detects the input of detection signals from the at least two contact detection sensors 5 as the input of an operation-enable signal. In this case, the sensor signal determiner 31 outputs to the drive controller 32 a drive-enable signal for enabling driving corresponding to the tilt of the operation lever 43 in Step S12.

Subsequently, the drive controller 32 controls the drive mechanism 25 in accordance with an inputted drive-command signal corresponding to the tilt of the operation lever 43 to drive the motion mechanism 22 (Step S13). In other words, when the operation lever 43 is tilted by the operator with at least two of the contact detection sensors 5 being pressed, the drive-command signal corresponding to the tilt of the operation lever 43 is inputted to the drive controller 32 to drive the motion mechanism 22.

Further, the sensor signal determiner 31 monitors the input of a detection signal from each of the contact detection sensors 5 while the motion mechanism 22 is driven by the drive mechanism 25, and determines whether two or more detection signals are inputted from the contact detection sensors 5 (Step S14).

When the determination result is Yes in Step S15 (two or more detection signals are still inputted), the process returns to Step S13 to continue the driving of the motion mechanism 22. When the determination result is No in Step S15, the sensor signal determiner 31 stops the output of the drive-enable signal to the drive controller 32 (Step S15). When the input of the drive-enable signal is stopped in Step S15, the drive controller 32 stops the output of the drive-control signal to the drive mechanism 25 and, consequently, stops the driving of the motion mechanism 2.2 (Step S16). In other words, even if the operation lever 43 is tilted and the drive-command signal is inputted, the motion mechanism 22 is not driven.

The controller 3 then determines whether a measurement process is to be continued (Step S17). For instance, when the user switches off the machine or inputs a command for terminating the measurement process, the measurement process is terminated. When the machine is not switched off or the command for terminating the measurement process is not inputted, the continuation of the measurement process is determined. The coordinate measuring machine 1 is thus set on standby for the input of a drive command, and the process returns to Step S11.

Advantage(s) of First Exemplary Embodiment

The first exemplary embodiment provides the following advantages.

In the first exemplary embodiment, the sensor signal determiner 31 does not determine the detection of an operation-enable signal unless detection signals are inputted from two or more of the contact detection sensors 5. Thus, even if an operator or any other worker accidentally touches the operation lever 43 by carelessness or the like, the sensor signal determiner 31 outputs no drive-enable signal unless two or more of the contact detection sensors 5 are simultaneously pressed.

If the operation lever 43 is accidentally touched by, for instance, an arm or clothing, two or more of the contact detection sensors 5 are usually very unlikely to be pressed at the same time. In other words, unless two or more of the contact detection sensors 5 are deliberately pressed, a drive-enable signal is hardly outputted. Accordingly, an erroneous motion of the motion mechanism 22 unintended by the operator can be prevented.

Further, since the three contact detection sensors 5 in total are attached to the lateral surface of the grip 432 at regular intervals, an operator can necessarily press two or more of the contact detection sensors 5 by hand when holding the grip 432. The above arrangement thus allows the operator to press two or more of the contact detection sensors 5 without any special motion, facilitating the operation of the coordinate measuring machine 1.

Further, in the first exemplary embodiment, the three contact detection sensors S are arranged at intervals of 120 degrees. More specifically, when a visible portion of the operation lever 43 as viewed from the front side of the operation unit 4 (the lower side in FIG. 3) is defined as a front surface of the operation lever 43, the contact detection sensor 5A is located on the front surface of the operation lever 43, the contact detection sensor 5B is located at the left on the back surface of the operation lever 43, and the contact detection sensor 5C is located at the right on the back surface.

In operating the operation lever 43, an operator usually stands in front of the operation unit 4 and moves his or her arm forward to hold the operation lever 43. In this case, the operation lever 43 is held to be covered from front to back. When the right hand of the operator is dominant, the contact detection sensor 5C and either one of the contact detection sensor 5A and the contact detection sensor 5B are pressed. When the left hand of the operator is dominant, the contact detection sensor 5B and either one of the contact detection sensor 5A and the contact detection sensor 5C are pressed. Consequently, two of the three contact detection sensors S are pressed irrespective of the dominant hand of the operator when the operator operates the operation lever 43. The above arrangement thus allows an operator who operates the operation lever 43 to press two of the contact detection sensors 5 through the usual operation of the operation lever 43 without the necessity of perforating complicated procedures, such as deliberately changing his/her posture to press two of the contact detection sensors 5, Second Exemplary Embodiment Next, the second exemplary embodiment of the invention will be described with reference to the attached drawing.

The second exemplary embodiment is different from the first exemplary embodiment in that the contact detection sensors 5 are not provided to the grip 432 unlike the first exemplary embodiment.

It should be noted that like elements described above are referenced by like reference numerals, and detailed descriptions thereof will be omitted below.

Figure 6:
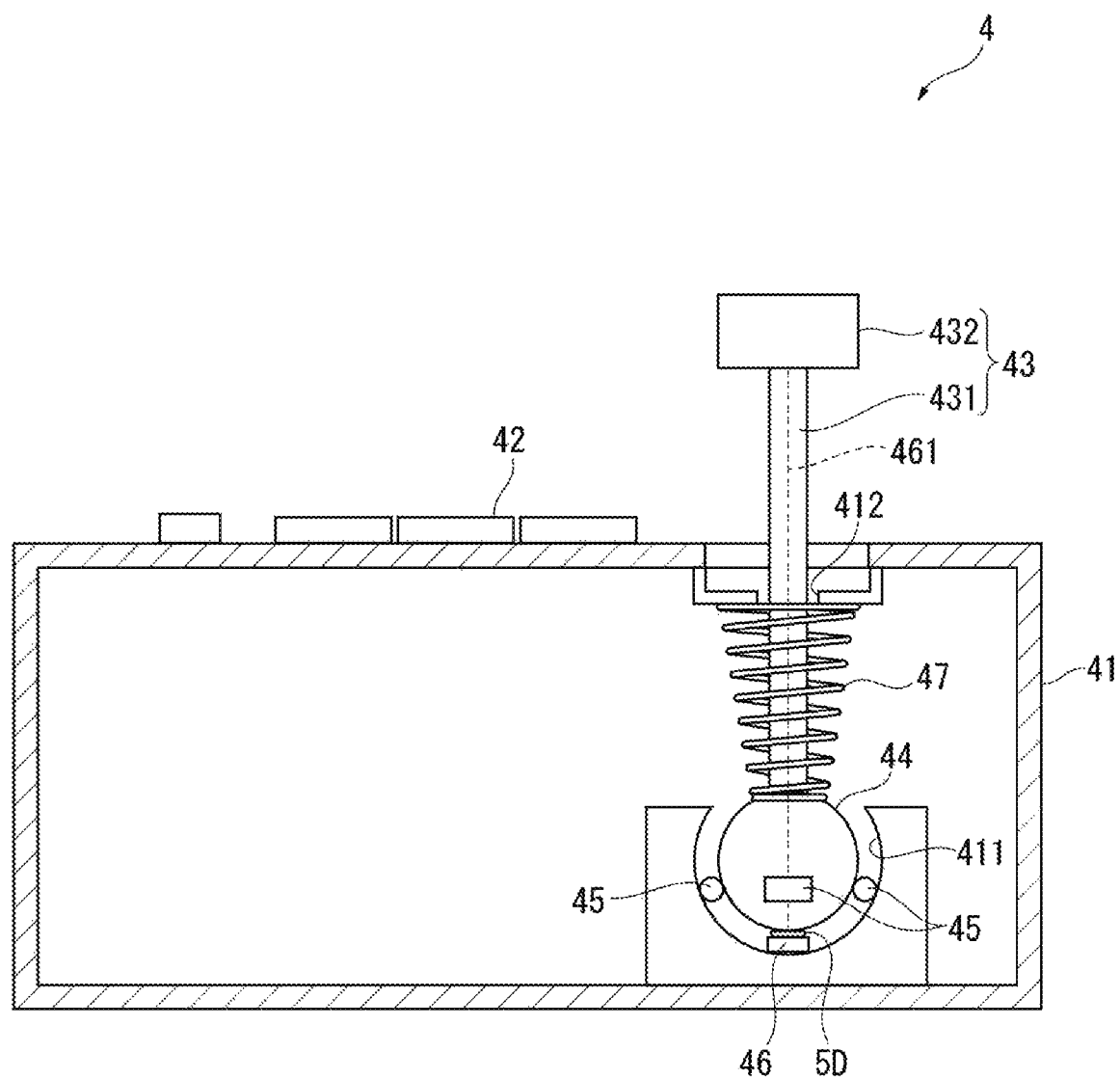
FIG. 6 is a sectional view of an operation unit according to a second exemplary embodiment of the invention.

FIG. 6 shows a cross-section of the operation unit 4 according to the second exemplary embodiment of the invention.

As shown in FIG. 6, a contact detection sensor 5D is attached to an upper surface of the rotation detector 46 in the second exemplary embodiment. The contact detection sensor 5D is always in contact with a bottom of the sphere 44 when the operation lever 43 is not operated.

Incidentally, the contact detection sensor 5D may be a pressure-sensitive sensor in the second exemplary embodiment. Thus, when the operation lever 43 is not operated, the contact detection sensor 5D always detects the contact with the bottom of the sphere 44, and outputs a detection signal to the sensor signal determiner 31. It should be noted that a detection signal may be outputted when the sphere 44 is separated from the contact detection sensor 5D, although a detection signal is outputted when and while the sphere 44 is in contact in the second exemplary embodiment.

Motion Control of Coordinate Measuring Machine

Figure 7:
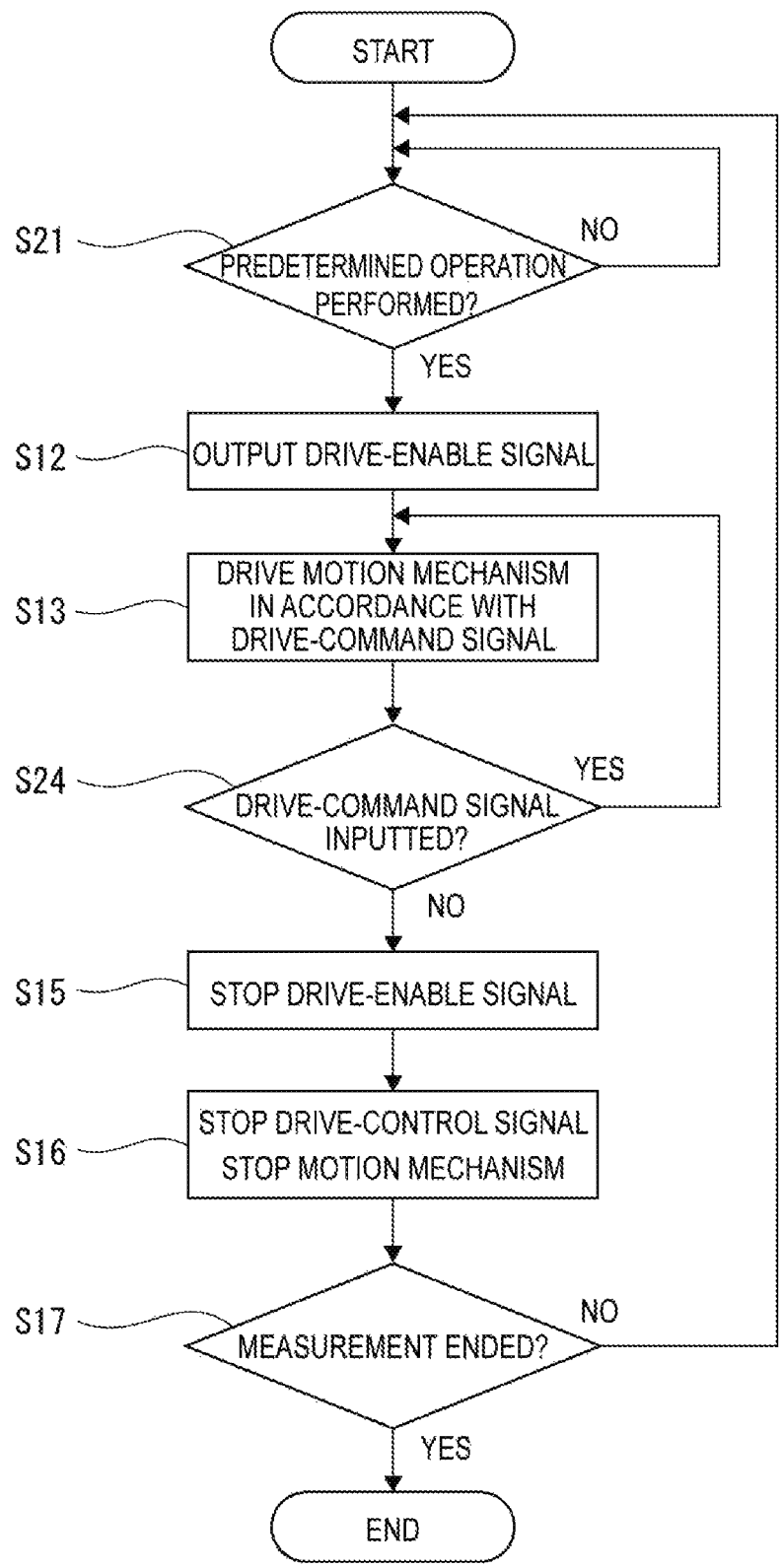
FIG. 7 is a flowchart showing a motion control of a coordinate measuring machine according to the second exemplary embodiment.

Next, description will be made on a motion control of the coordinate measuring machine 1 according to the second exemplary embodiment with reference to the attached drawing. FIG. 7 is a flowchart showing the motion control of the coordinate measuring machine 1 according to the second exemplary embodiment.

In the second exemplary embodiment, Step S21 is performed in place of Step S11 of the first exemplary embodiment as shown in FIG. 7. In Step S21, the sensor signal determiner 31 determines whether a predetermined operation is performed.

In the second exemplary embodiment, it is determined whether the operation lever 43 is pulled up as the predetermined operation. Specifically, when an operator pulls up the operation lever 43, the sphere 44 is separated from the contact detection sensor 5D, and the contact detection sensor 5D stops outputting the detection signal. The sensor signal determiner 31 determines whether the input of the detection signal from the contact detection sensor 5D is stopped as described above, and determines that the predetermined operation is performed (determination result: Yes) in response to the stop of the input of the detection signal.

When the determination result in Step S21 is No, the sensor signal determiner 31 again performs the process in Step S21. In other words, even if the operation lever 43 is tilted, the drive controller 32 receive no drive-command signal corresponding to the tilt of the operation lever 43 until the predetermined operation is performed.

In contrast, when the determination result is Yes in Step S21, the processes subsequent to Step S12 in the first exemplary embodiment are performed.

Further, Step S24 is performed in the second exemplary embodiment in place of Step S14 in the first exemplary embodiment.

In Step S24, the sensor signal determiner 31 monitors the input of drive-command signals from the rollers 45 and the rotation detector 46 while the motion mechanism 22 is driven by the drive mechanism 25, and determines whether the drive-command signals are inputted.

When the determination result is Yes in Step S24 (the drive-command signals are inputted), the process returns to Step S13 to continue the driving of the motion mechanism 22.

When the determination result is No in Step S24, the process in Step S15 is performed to stop the output of the drive-enable signal to the drive controller 32.

In other words, when the operator does not operate the operation lever 43 to let the operation lever 43 return to a neutral position, the sensor signal determiner 31 stops the output of the drive-enable signal.

It should be noted that time elapsed after the operation lever 43 returns to the neutral position may be counted to perform the process in Step S15 when the counted time reaches a predetermined time. In this case, the operator can continuously operate the operation lever 43 without performing the predetermined operation (the pull-up of the operation lever 43) each time when the operation lever 43 returns to the neutral position.

The processes subsequent to Step S15 may be the same as those in the first exemplary embodiment, and the process may return to Step S21 when the determination result is No in Step S17.

Advantage(s) of Second Exemplary Embodiment

The second exemplary embodiment provides the following advantages.

In the second exemplary embodiment, the sensor signal determiner 31 does not determine the detection of an operation-enable signal unless an operator, for instance, deliberately pulls the operation lever 43 to separate the sphere 44 from the contact detection sensor 5D. Thus, even if an operator or any other worker accidentally touches the operation lever 43 by carelessness or the like, the sensor signal determiner 31 outputs no drive-enable signal unless the sphere 44 is separated from the contact detection sensor 5D.

If the operation lever 43 is accidentally touched, an external force is usually very unlikely to be applied to pull up the operation lever 43. In other words, unless, for instance, the operation lever 43 is deliberately pulled up, the sphere 44 is hardly separated from the contact detection sensor 5D. Accordingly, an erroneous motion of the motion mechanism 22 unintended by the operator can be prevented.

Third Exemplary Embodiment

Next, the third exemplary embodiment of the invention will be described with reference to the attached drawing.

In the first and second exemplary embodiments, the working portion according to the invention is exemplarily in the form of the contact probe 21 being brought into contact with the workpiece 10 to measure a profile of the workpiece 10. In contrast, the third exemplary embodiment is different from the first and second exemplary embodiments in that the working portion is in the form of an image probe 21B configured to measure a profile of the workpiece 10 by image measurement.

Figure 8:
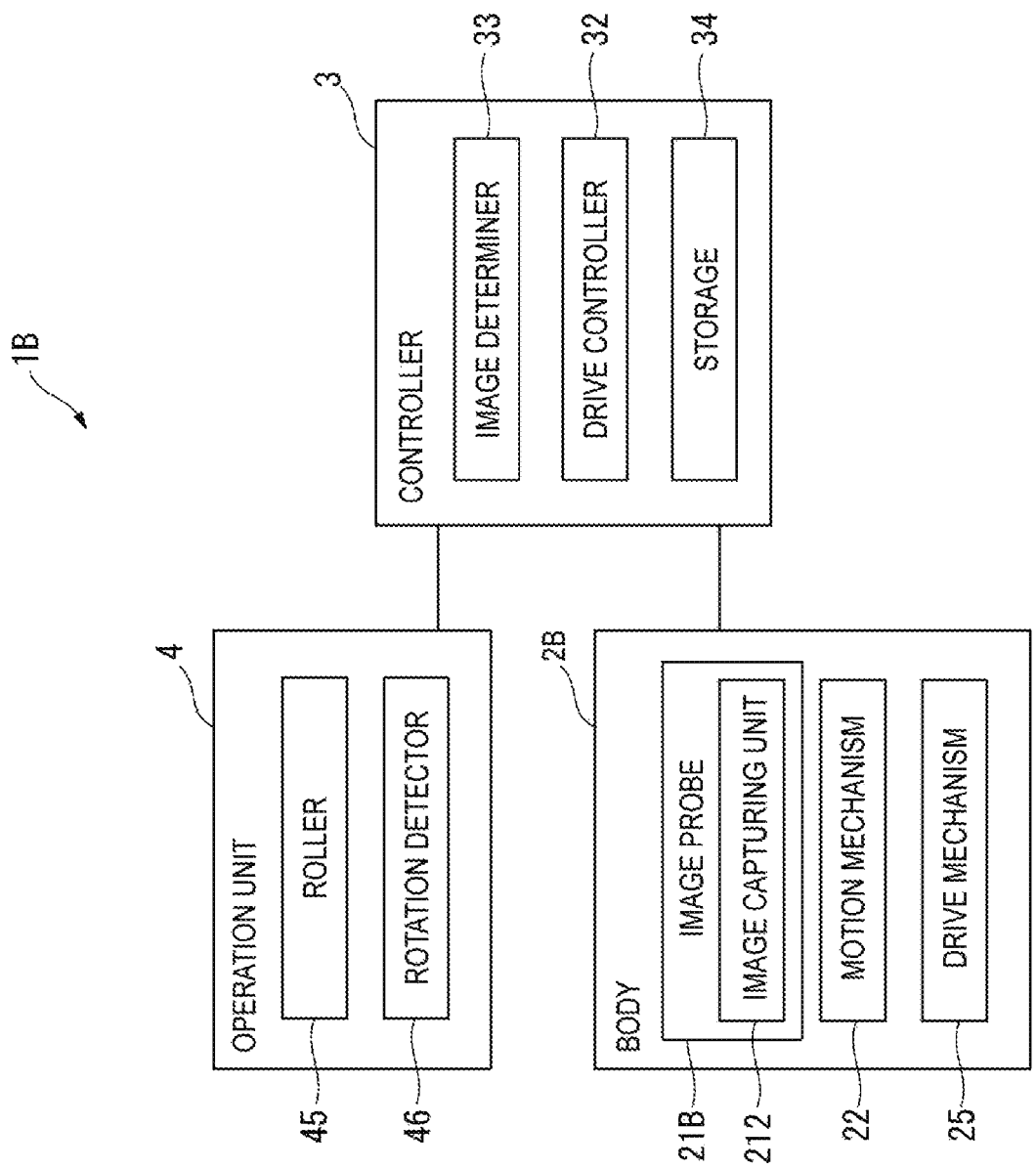
FIG. 8 is a block diagram showing a schematic arrangement of a coordinate measuring machine according to a third exemplary embodiment.

FIG. 8 is a block diagram showing a schematic arrangement of a coordinate measuring machine 1B according to the third exemplary embodiment of the invention. The coordinate measuring machine 1B of the third exemplary embodiment is configured to capture an image of the workpiece 10 and measure, for instance, a dimension of the workpiece 10 with reference to the captured image data.

As shown in FIG. 8, a body 2B of the coordinate measuring machine 1B includes an image probe 21B including an image capturing unit 212 configured to capture an image of the workpiece 10.

The controller 3 includes the drive controller 32 configured to control the driving of the drive mechanism 25 of the motion mechanism 22, and an image determiner 33 configured to determine whether the image captured by the image capturing unit 212 is the same as an authenticated image having been registered.

The controller 3 of the third exemplary embodiment also includes a storage 34 for storing the authenticated image.

Motion Control of Coordinate Measuring Machine

Figure 9:
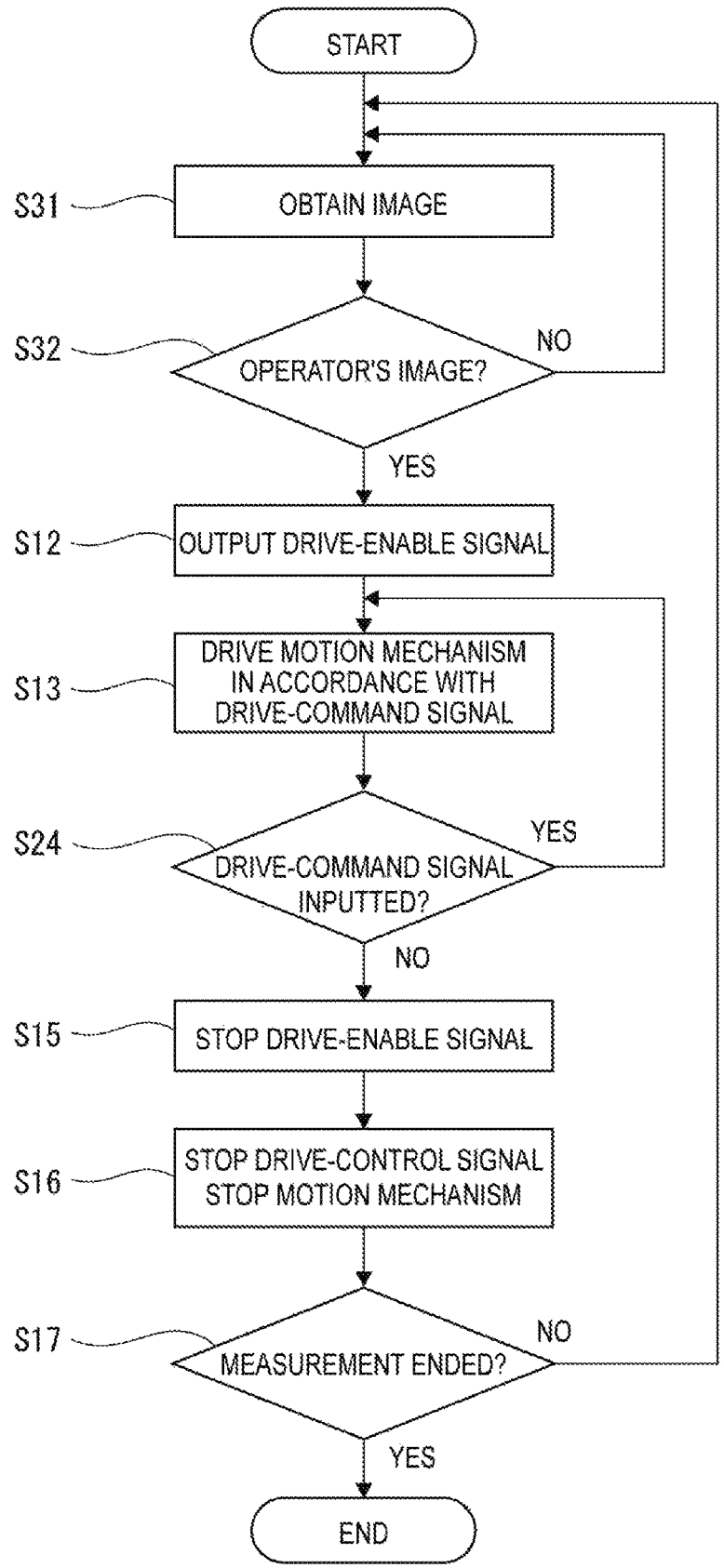
FIG. 9 is a flowchart showing a motion control of the coordinate measuring machine according to the third exemplary embodiment.

Next, description will be made on an operation method of the coordinate measuring machine 1B according to the third exemplary embodiment with reference to the attached drawing. FIG. 9 is a flowchart showing the motion control of the coordinate measuring machine 1B according to the third exemplary embodiment.

As shown in FIG. 9, to enable an operator to move the image probe 21B of the body 2B to measure a profile of the workpiece 10, an image of the operator's fingerprint needs to be captured using the image capturing unit 212.

The controller 3 thus obtains (reads) the captured image inputted from the image capturing unit 212 (Step S31). It should be noted that any image showing biological information for identifying individuals, such as images of face, iris, and palm print, may be captured, although the image of a fingerprint is captured in the third exemplary embodiment.

Further, the image capturing unit 212 may be adjusted in advance to stop to face the operation unit 4 whenever the coordinate measuring machine 1B is not in measurement operation. Such an adjustment eliminates the necessity for the operator to change the position of the image probe 21B or move him/herself in front of the image probe 21B.

Next, the image determiner 33 reads the authenticated image stored in the storage 34, and determines whether the image captured in Step S31 is the same as the authenticated image (Step S32). Incidentally, the image determiner 33 may recognize the operator's fingerprint through a typical fingerprint recognition process. Further, such image matching may be performed by a typical matching process. For instance, the image matching may be performed by computing the amount of characteristics of each part of the recognized fingerprint image, and determining whether a difference of the calculated amount of characteristics is equal to or below a predetermined threshold.

It should be noted that images of the fingerprints of a plurality of operators who may operate the coordinate measuring machine 1B may be registered and stored in the storage 34 as authenticated images. In such a case, it may be determined which one of the authenticated images is the same as the captured image.

When the determination result is No in Step S32, the image determiner 33 waits until an image of the operator's fingerprint is captured using the image capturing unit 212 (i.e., until the determination result in Step S32 becomes Yes).

When the determination result in Step S32 is Yes, the image determiner 33 determines that an accepted image has been captured, and performs substantially the same process in Step S12 to output a drive-enable signal to the drive controller 32. It should be noted that the processes subsequent to Step S12 may be the same as those in the second exemplary embodiment, and the process may return to Step S31 when the determination result is No in Step S17 in the third exemplary embodiment.

Advantage(s) of Third Exemplary Embodiment

The third exemplary embodiment provides the following advantages.

In the third exemplary embodiment, the image capturing unit 212 captures an image of an operator's fingerprint, and the image determiner 33 determines whether the captured image is the same as an authenticated image having been stored in the storage 34. The drive controller 32 outputs no drive-control signal to the drive mechanism 25 unless the accepted image is captured by the image capturing unit 212.

Thus, even if, for instance, any worker other than the operator or a tool accidentally touches the operation lever 43, no drive-control signal is outputted to the drive mechanism 25 unless the accepted image is captured. The drive mechanism 25 is thus not driven, preventing an erroneous motion of the image probe 21B unintended by the operator.

Further, since the image determiner 33 collates the captured image with the operator's fingerprint having been registered, an unregistered person is prevented from operating the coordinate measuring machine 1B. Thus, even if an unregistered unskilled worker tries to operate the coordinate measuring machine 1B, no drive-control signal is outputted to the drive mechanism 25 and the drive mechanism 25 is not driven, preventing an erroneous motion that would be caused by the unskilled worker's operation.

Modification(s)

The scope of the invention is not limited to the above-described exemplary embodiment(s), but includes any modifications and improvements compatible with the invention.

Although the contact detection sensors 5 are attached to the lateral surface of the grip 432 of the operation lever 43 in the first exemplary embodiment, the contact detection sensors 5 may alternatively be attached to an upper surface or a lateral surface of the operation box 41, or the operation button 42 may serve as the contact detection sensor 5. In operating the operation unit 4, an operator usually holds the operation lever 43 by one hand while putting the other hand on the lateral surface or the upper surface of the operation box 41 or holding (lifting) the operation box 41 by the other hand. Accordingly, the contact detection sensors 5 located at a position where the other hand is supposed to be put (the lateral surface or the front surface of the operation box 41) allow for determining whether the operator intentionally operates the operation lever 43. Further, the contact detection sensors 5 may be attached to a pedal for receiving an operator's foot provided to the leg 40.

Although the three contact detection sensors 5 in total are attached to the lateral surface of the grip 432 at regular intervals, the contact detection sensors 5 may be attached to be mutually opposite with respect to an axial direction of the operation lever 43, and/or may be attached at irregular intervals. In other words, the contact detection sensors 5 may be attached at any position that is necessarily touched by an operator who operates the machine but not touched if the operator or any other worker accidentally touches the operation lever 43 by carelessness or the like. For instance, the contact detection sensors 5 may be attached only at the back surface of the operation lever 43. In this case, if the operation lever 43 is touched by, for instance, an arm, clothing or tool at its front or lateral surface and tilted, the contact detection sensors 5 detect nothing.

Although the pressing button switch is used as each of the contact detection sensors 5, an electro-capacitance sensor (living-body contact sensor) or a pressure-sensitive sensor may alternatively be used. In other words, any sensor configured to detect that the sensor is pressed or touched by a human hand is usable.

Although the second exemplary embodiment employs the contact detection sensor 5D, which is attached on the upper surface of the rotation detector 46 to detect the contact with the sphere 44, to determine whether the predetermined operation, i.e., the pull-up of the operation lever 43, is performed, the invention is not limited thereto. The predetermined operation may be pressing the operation lever 43 toward the operation box 41. In this case, the sensor signal determiner 31 detects, as an operation-enable signal, a detection signal outputted from the contact detection sensor 5D when the operation lever 43 is pressed toward the operation box 41.

Further, the sensor signal determiner 31 may determine an operation signal from the operation button 42 as an operation-enable signal irrespective of the operation on the operation lever 43. For instance, the sensor signal determiner 31 may determine, as an operation-enable signal, an operation signal outputted when a plurality of operation buttons 42 and/or the operation lever 43 are operated in a predetermined order.

Further, an acceleration sensor and/or a tilt sensor may be attached to the operation lever 43.

In the case where the acceleration sensor is attached to the operation lever 43, an upper limit of the acceleration of the operation lever 43 measured during a normal operation by an operator is set in advance, and the sensor signal determiner 31 determines the detection of an operation-enable signal when a measured acceleration of the operation lever 43 does not exceed the upper limit.

The above arrangement allows for preventing the sensor signal determiner 31 from determining the detection of an operation-enable signal if an operator, for instance, lets the operation box 41 fall down and an acceleration of the operation lever 43 exceeding the predetermined upper limit is measured due to an external force suddenly applied to the operation lever 43. No drive-control signal is thus outputted from the drive controller 32 to the drive mechanism 25, preventing an erroneous motion of the motion mechanism 22 unintended by the operator.

Further, a stress detection sensor such as a strain gauge may be attached along the window 412 of the operation box 41. In this case, a value measured by the stress detection sensor when the shaft 431 comes into contact with the stress detection sensor during a normal operation by an operator may be set in advance as an upper limit. The sensor signal determiner 31 may output a drive-enable signal when detecting, as an operation-enable signal, a detection signal from the stress detection sensor equal to or less than the predetermined upper limit, and stop the output of the drive-enable signal when detecting a detection signal exceeding the upper limit.

Although the image capturing unit 212 of the image probe 21B captures an image of an operator's fingerprint in the third exemplary embodiment, a separate image capturing unit may alternatively be provided to, for instance, the body 2 or the operation box 41. In other words, any image capturing unit configured to capture an image intended by an operator, such as an operator's fingerprint, is usable. In this case, the coordinate measuring machine 1B may be different from a coordinate image measuring machine configured to measure, for instance, a dimension of the workpiece 10 with reference to the captured image data.

A scanner having an emitting zone different from that of a light source for the image capturing unit 212 of the image probe 21B may be additionally provided. In this case, such a scanner may be provided to the image probe 21B or, for instance, to the operation unit 4. The addition of the scanner allows for the use of a light source having an emitting zone suitable for, for instance, a retina scan or a vein scan (e.g., a zone from a visual light range to a near-infrared light) and, consequently, for a biometric authentication with a higher accuracy.

Further, a voice recognizer such as a microphone may be provided to the probe 21, image probe 21B or the operation unit 4. In this case, the controller 3 further includes a voice analyzer configured to analyze a voiceprint of voice obtained by the voice recognizer, and a voiceprint determiner configured to determine whether the analyzed voice is the same as a reference voiceprint having been stored in the storage 34. When the voiceprint determiner determines that the voiceprint of an operator is the same as such a predetermined voiceprint, the voiceprint determiner performs substantially the same process in Step S12 to output a drive-enable signal to the drive controller 32. In the above arrangement, the voice analyzer may analyze a phoneme sequence of the obtained voice as well as the voiceprint of the operator. In this case, the voiceprint determiner may determine whether the phoneme sequence is the same as a predetermined phoneme sequence. The operator can thus be enabled to operate the operation unit 4 only when saying a specific word.

Further, the biological information of an operator in the form of image or voice is exemplarily obtained as authentication information, but the invention is not limited thereto. For instance, the information may be a part of the components of the coordinate measuring machine 1B (e.g., a drive component as a part of the column 241, or a reference sphere), an image of a specific object having been located near the coordinate measuring machine 1B, or a specific voice. In other words, the invention only requires that authentication information, such as an image or voice, is obtained by, for instance, the image capturing unit, the scanner or the voice recognizer before an operator operates the operation unit 4, and the operator is enabled to operate the operation unit 4 only when the obtained authentication information is the same as the predetermined accepted information.

Although the controller 3 includes the sensor signal determiner 31 in the above exemplary embodiments, the operation unit 4 may alternatively include a sensor single determining circuit. In this case, the input of a drive-command signal to the drive controller 32 may be enabled by, for instance, closing a switch of the drive circuit connected to the operation button 42 and/or the operation lever 43 when the contact detection sensors 5 detect contact.

Further, the operation unit 4 may include, for instance, an arrow key and/or a track ball in place of the operation lever 43. In other words, any component is usable as long as an operator can input a motion direction of the probe 21.

Although the above exemplary embodiments employ an industrial machine as the coordinate measuring machine 1, the invention is also applicable to a coordinate machine tool configured to move a tool by a drive mechanism to machine a workpiece. In other words, the invention is applicable to any industrial machine configured to move a mobile body by a drive mechanism.

Further, the specific arrangements and processes in implementing the invention may be modified or improved if necessary as long as the modifications and improvements are compatible with the invention.

What is claimed is:

1. An industrial machine comprising:
   a working portion configured to perform a predetermined operation on a workpiece;
   an operation unit configured to input an operation signal for instructing a motion of the working portion; and an operation detector configured to detect the operation signal, which is inputted in response to a predetermined operation, as an operation-enable signal for enabling the working portion to move, wherein the operation unit comprises a body, and an operation lever comprising a shaft tiltable with respect to the body such that a tilt angle or a position of the shaft is changeable with respect to the body, the operation lever has a circumferential surface attached with a plurality of contact detection sensors configured to output contact detection signals when detecting contact with an object, and the operation detector is configured to detect input of the contact detection signals from at least two of the contact detection sensors as the operation-enable signal.

2. The industrial machine according to claim 1, wherein at least a pair of the contact detection sensors are opposite to each other across the shaft of the operation lever, and the operation detector is configured to detect the input of the contact detection signals from the at least pair of the contact detection sensors as the operation-enable signal.

3. The industrial machine according to claim 1, further comprising a drive controller configured to drive the working portion in accordance with the operation signal from the operation unit when the operation-enable signal is detected by the operation detector.

4. The industrial machine according to claim 1, wherein each of the contact detection sensors is a living-body contact sensor configured to output a living-body contact signal in response to contact with a living body.

5. The industrial machine according to claim 4, further comprising:

a drive controller configured to drive the working portion in accordance with the operation signal from the operation unit when the operation-enable signal is detected by the operation detector.

6. An industrial machine comprising:

a working portion configured to perform a predetermined operation on a workpiece;

an operation unit configured to input an operation signal for instructing a motion of the working portion; and an operation detector configured to detect the operation signal, which is inputted in response to a predetermined operation, as an operation-enable signal for enabling the working portion to move, wherein the operation unit comprises a body, and an operation lever comprising a shaft tiltable with respect to the body such that a tilt angle or a position of the shaft is changeable with respect to the body, and the operation detector is configured to detect the operation signal inputted in response to the predetermined operation as the operation-enable signal, the predetermined operation comprising moving the operation lever with respect to the operation unit at an acceleration or tilt equal to or below a predetermined threshold.

7. The industrial machine according to claim 6, further comprising:

a drive controller configured to drive the working portion in accordance with the operation signal from the operation unit when the operation-enable signal is detected by the operation detector.

8. A control method of an industrial machine, the industrial machine comprising:

a working portion configured to perform a predetermined operation on a workpiece;

an operation unit configured to input an operation signal for instructing a motion of the working portion, the operation unit comprising a body, and an operation lever comprising a shaft tiltable with respect to the body such that a tilt angle or a position of the shaft is changeable with respect to the body; and a plurality of contact detection sensors provided on a circumferential surface of the operation lever, the contact decision sensors being configured to output contact detection signals when detecting contact with an object, the control method comprising:

detecting an input of the contact detection signals from at least two of the contact detection sensors as an operation-enable signal for enabling the working portion to move; and driving the working portion in accordance with the operation signal from the operation unit after the operation-enable signal is detected.

9. A control method of an industrial machine, the industrial machine comprising:

a working portion configured to perform a predetermined operation on a workpiece; and an operation unit configured to input an operation signal for instructing a motion of the working portion, the operation unit comprising a body, and an operation lever comprising a shaft tiltable with respect to the body such that a tilt angle or a position of the shaft is changeable with respect to the body, the control method comprising:

detecting the operation signal as an operation-enable signal for enabling the working portion to move, when an acceleration or tilt of the operation lever with respect to the body is equal to or below a predetermined threshold; and driving the working portion in accordance with the operation signal from the operation unit after the operation-enable signal is detected.

10. A control method of an industrial machine, the industrial machine comprising:

a working portion configured to perform a predetermined operation on a workpiece; and an operation unit configured to input an operation signal for instructing a motion of the working portion, the operation unit comprising a body, and an operation lever comprising a shaft tiltable with respect to the body such that a tilt angle or a position of the shaft is changeable with respect to the body, the operation lever comprising a circumferential surface attached with a plurality of contact detection sensors configured to output contact detection signals when detecting contact with an object, the control method comprising:

detecting the operation signal as an operation-enable signal for enabling the working portion to move when the operation signal from the operation unit and the contact detection signals from at least two of the contact detection sensors are detected; and driving the working portion in accordance with the operation signal from the operation unit after the operation-enable signal is detected.

* * * * *